April 28, 1964  B. O. BREKKE ETAL  3,131,371
WINDING FORM HAVING MEANS FOR PROTECTING
ELECTRICAL COIL LEADS
Filed March 9, 1959

INVENTOR.
BYRON O. BREKKE
ROY C. JOHNSTON
BY Alfred N. Feldman

ATTORNEY 3,131,371
WINDING FORM HAVING MEANS FOR PROTECTING ELECTRICAL COIL LEADS
Byron O. Brekke, Brooklyn Center, Minn., and Roy C. Johnston, Dallas, Tex., assignors to Minneapolis-Honeywell Regulator Company, Minneapolis, Minn., a corporation of Delaware
Filed Mar. 9, 1959, Ser. No. 797,954
3 Claims. (Cl. 336—192)

The present invention is directed to an improved winding form, and more particularly, to a winding form suitable for use in all types of electrical equipment.

The art of winding electrical coils for such devices as transformers, inductors, solenoids, relays, and other such units has become highly developed and in many cases has been automated. As such, the production quantities of units utilizing electrical windings run in the millions of units per year on certain types and sizes of devices. Any savings which can be accomplished in the production of this tremendous number of units constitutes a substantial savings on an over-all basis for each year.

The winding of electrical coils on winding forms or bobbins has been known and used extensively for quite some time. In more recent years a trend has developed to increase the number of bobbin-wound coils for transformers and relays as bobbin winding has certain structural advantages over other forms of windings. This is particularly true where temperature becomes a problem as bobbin-wound coils can be manufactured conveniently of materials which withstand higher ambient temperatures than can other types of low-cost windings. In order to make bobbin-wound coils practical from a cost standpoint, it becomes necessary to provide a simple arrangement for leading the initial wire from the center of the bobbin or the winding portion of the form to an external point. In the past, expedients such as holes drilled through the flange of the winding form or bobbin have been utilized. This arrangement has not been satisfactory as it takes a considerable amount of manual dexterity and time to feed a small wire through a drilled hole for the beginning of the winding.

Some manufacturers have provided for the lead-out or beginning end of the wire to be brought out directly up along the inside of the flange from the winding portion to an external point, and have been forced to provide extra insulation to protect this lead-out wire from the electrical potential difference occurring between the outer turns of the coil and the lead-out wire. This arrangement is cumbersome in production quantities as it requires handling the winding form, the wire, and insulating materials. It also leads to an unevenness as each turn of wire adjacent the flange passes around the lead-out wire. Another form of bobbin utilizes a groove in the flange to protect the lead-out wire and this groove is covered with a sheet of insulating material or a plastic insulating material is forced down into the groove to hold the lead-out wire away from the subsequent turns on the winding form.

All of the prior art arrangements noted above require a good deal of initial preparation before the coil body can be wound. While this preparation appears quite small on a per unit basis, when a single unit reaches production quantities in excess of millions per year, this relatively small cost item becomes a major expenditure. The presently disclosed winding form avoids the problems previously encountered in winding bobbin-type coils, and in addition, lends itself to automatic winding at a substantial cost saving per unit. The presently disclosed invention is a bobbin-type winding form which utilizes a slot in the flange of the winding bobbin, but the slot is of a unique design which eliminates the need of any secondary insulating material either directly on the lead-out wire or placed against the bobbin itself. The slot is placed so that the lead-out wire is insulated both from the subsequent turns of wire on the winding form as well as from the outer edge of the bobbin. This allows for placing the bobbin directly up against metallic surfaces such as laminations or a mounting plate. The novel device of the present disclosure is in the form of a compound slot that varies from a small opening at a point adjacent to the winding form to a relatively wide opening at the surface of the bobbin. The slot further has a continuous opening extending from the winding portion to the edge of the bobbin flange so that the wire can be inserted from the inner side of the flange and pulled down into the slot thereby placing an insulated wall between the lead-out wire and the balance of the windings. The arrangement will be described in detail subsequently, but it should be noted that the primary object of the present invention is to disclose an improved winding form for electrical devices of all types.

It is a further object of the present invention to disclose a bobbin or winding form that is inexpensive to manufacture as it is a unitary, molded unit.

Yet another object of the present invention is to provide a winding form that is faster and simpler to wind because of the shape of a compound slot in the flange of the form.

Still a further object is to provide a winding form that is faster and easier to wind as the lead-out wire can be readily placed in the winding form.

The present invention further has as an object the disclosure of a winding form that has an insulated lead-out wire that is protected both from the subsequent turns of wire and from any mounting means associated with the unit.

These and other objects will become apparent when a complete consideration of the specification and drawing is undertaken.

In the present drawing, a typical application of the present invention is disclosed, wherein.

Figure 1:
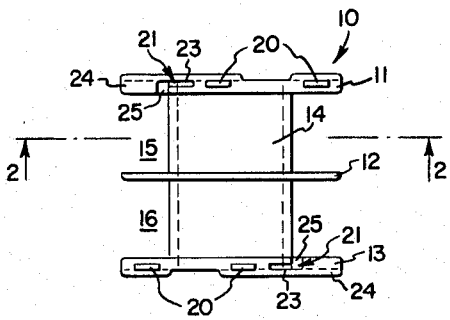
FIGURE 1 is an end view of a one-piece molded bobbin utilized for a conventional transformer.
Figure 2:
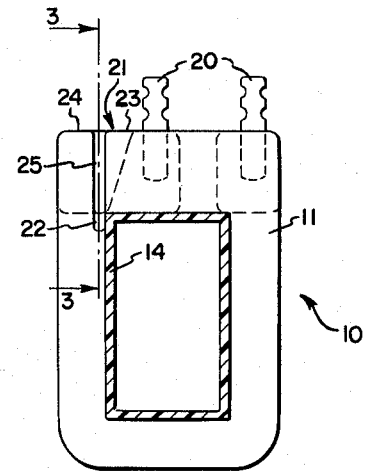
FIGURE 2 is a section along the lines 2—2 of FIGURE 1.

In the specific embodiment disclosed, a winding form or bobbin 10 is generally disclosed. The winding form 10 has three flanges 11, 12, and 13. A winding portion 14 in the form of a rectangular, tubular member is shown. The flanges 11, 12, and 13 are molded in an integral piece with the winding portion 14. Any convenient molding material can be used, but in the preferred embodiment a plastic such as nylon is utilized.

The flanges 11, 12, and 13 are spaced along the winding portion 14 to yield two winding spaces 15 and 16. The winding spaces 15 and 16 are separated to provide space for a primary and secondary winding of a transformer, as disclosed in FIGURE 4. Each of the flanges 11 and 13 have a continuous outer surface remote from the winding spaces 15 and 16.

A plurality of metal terminals 20 are inserted into flanges 11 and 13 to provide electrical terminals for the device. The terminals 20 can be of any convenient type and they can either be inserted in holes molded into the flanges 11 and 13 or can be integrally molded into the flanges when the winding form 10 is produced. The terminals and their insertion into the winding form 10 form no part of the present invention and are disclosed solely for the sake of continuity.

Compound slots 21 are disclosed molded into flanges 11 and 13 between their inner and outer surfaces, and these slots form the heart of the present invention. The slots 21 are substantially enclosed by the material forming the flanges 11 and 13. The slots vary progressively from a minimum width at 22, which is adjacent to the winding portion 14 of the bobbin 10. The width of slots 21 increases progressively from the bottom 22 to a maximum width 23 at the outer surfaces or peripheral edges 24 of the flanges 11 and 13. The purpose for the varying width will be described in detail below.

In addition a second portion of slots 21, or openings 25 in the inner surfaces of the flanges 11 and 13, form means of communication between the winding spaces 15 and 16 and the interior of slots 21. It will be noted that the openings 25 are uniform in width and extend from the winding portion 14 to the peripheral edges 24 of each of the flanges 11 and 13. The openings 25 are provided to connect the winding spaces 15 and 16 with the insulated parts of slots 21 so that the lead-out wires can pass to the terminals 20.

Figure 4:
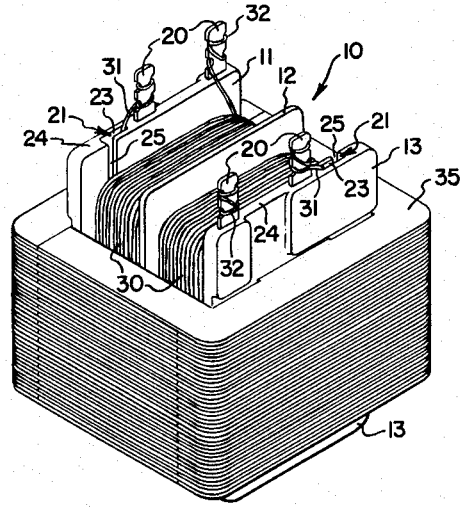
FIGURE 4 is an isometric view of an assembled transformer utilizing the present invention.
Figure 3:
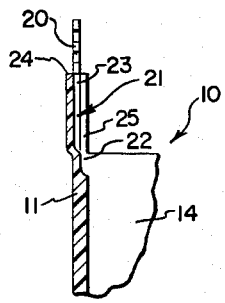
FIGURE 3 is a partial section along the lines 3—3 of FIGURE 2 and discloses the novel lead-out slot.

In order to more fully understand the use of the slots 21 in the presently disclosed winding forms, FIGURE 4 will be described in detail. In FIGURE 4 a transformer is disclosed utilizing the winding form 10. Two electrical windings 30 are disclosed having lead-out wires 31 and ending wires 32. The lead-out wires 31 are fed from the winding portion 14 of the coil form 10 into the bottoms 22 of the slots 21 through the openings 25 and over to the maximum width 23 and anchored to the terminals 20, adjacent to the top edge 23 of slots 21 at the outer surface or peripheral edge 24. It should be noted that with this arrangement the lead-out wires 31 are completely recessed except at the bottoms 22 of the slots 21. This allows for the lead-out wires 31 to be electrically and mechanically isolated from the windings 30. The windings 30 are appropriately placed in the winding spaces 15 and 16 by any conventional winding technique and end up with the ending wires 32 adjacent to the outer flanges 11 and 13 at the surface of the windings 30. The ending wires 32 are then anchored to the remaining terminals 20 to form the second electrical connection for each of the coils 30. Laminations 35 are then inserted in the center of the winding form 10 to complete the transformer. The laminations 35 can be of any convenient design and have been disclosed as an E–I type of lamination.

It becomes apparent in considering FIGURE 4 that after the coils 30 have been put in place that a portion of the slots 21 are closed along the openings 25 by the turns of wire of the coils 30. It is further noted that the turns of wire of coils 30 are electrically and mechanically separated from the lead-out wires 31 except at the point where the lead-out wires 31 begin along the winding portion 14. As such, there is no electrical difference of potential existent across the lead-out wires 31 and the coils 30 except where there is sufficient insulation to properly protect the wires.

The winding form disclosed provides an arrangement whereby electrical coils of all types can be wound on the bobbin-type form in a rapid manner since the initial threading of the lead-out wires 31 can be easily accomplished. The lead-out wires 31 are fully protected electrically and mechanically and require no extra insulation other than the normal coating or insulation present on each turn of the wire as contained in the over-all electrical device. Since the lead-out wires 31 can be fed into the slots 21 by sliding them into the openings 25, it is possible to provide the operation rapidly and the winding can be accomplished automatically. It becomes apparent that it is not necessary to disconnect the lead-out wires 31 from the original source and therefore it would be possible to have a continuous production of coil units produced automatically thereby eliminating much of the costly hand work now involved in leading wires into the beginning hole or slot in more conventional forms of bobbins.

The present description has shown a single embodiment directed to a two-coil type transformer. It would be obvious to one skilled in the art to apply the same teaching to a single winding for an inductor or relay, as well as to apply the present invention to a multi-coil arrangement, as may be needed in some electrical devices. As such, the applicants do not wish to be limited to the specific disclosure contained as being illustrative of one preferred embodiment, but wish to be limited only by the appended claims.

We claim as our invention:

1. A winding form whereon an electrical coil is formed by progressively adding turns of an insulated wire in layers in a winding space: said winding form comprising a winding portion, and a flange of insulating material attached to said winding portion to partially define said winding space; said flange having a continuous outer surface, a peripheral edge, and an inner surface adjacent said winding space; said flange having a slot formed therein between said inner surface and said continuous outer surface with an opening through said peripheral edge extending a substantial distance along said edge; said flange wholly insulating said slot from said continuous outer surface; said slot further having a second opening in communication with said winding space in the inner surface, which second opening is continuous from said winding portion to said peripheral edge; the extent of said first named opening along said edge being substantially greater than the width of said second opening; and said slot extending continuously from the inner surface adjacent said winding portion out through said peripheral edge to provide a passage for a wire from the inner layer of the coil out through said peripheral edge with said wire being insulated by the material of the flange from both said continuous outer surface and said winding space.

2. A winding form whereon an electrical coil is formed by progressively adding turns of an insulated wire in layers in a winding space: said winding form comprising a winding portion, and a plurality of flanges of insulating material attached to said winding portion to define said winding space; one of said flanges having a continuous outer surface, a peripheral edge, and an inner surface adjacent said winding space; said last named flange having a slot formed therein between said inner surface and said continuous outer surface with an opening through said peripheral edge extending a substantial distance along said edge; said last named flange wholly insulating said slot from said continuous outer surface; said slot further having a second opening in communication with said winding space in the inner surface, which second opening is continuous from said winding portion to said peripheral edge; the extent of said first named opening along said edge being substantially greater than the width of said second opening; and said slot extending continuously from the inner surface adjacent said winding portion out through said peripheral edge to provide a passage for a wire from the inner layer of the coil out through said peripheral edge with said wire being insulated by the material of the flange from both said continuous outer surface and said winding space.

3. A winding form whereon an electrical coil is formed by progressively adding turns of an insulated wire in layers in a winding space: said winding form comprising a winding portion, and a flange of insulating material attached to said winding portion to partially define said winding space; said flange having a continuous outer surface, a peripheral edge, and an inner surface adjacent said winding space; said flange having a slot formed therein between said inner surface and said continuous outer surface with an opening through said peripheral edge extending a substantial distance along said edge; said flange wholly insulating said slot from said continuous outer surface; said slot further having a progressively increasing width being a minimum at an end adjacent said winding portion and a maximum at the peripheral edge, and having a second opening in communication with said winding space in the inner surface, which second opening is continuous from said winding portion to said peripheral edge; the extent of said first named opening along said edge being substantially greater than the width of said second opening; and said slot extending continuously from the inner surface adjacent said winding portion out through said peripheral edge to provide a passage for a wire from the inner layer of the coil out through said peripheral edge with said wire being insulated by the material of the flange from both said outer surface and said winding space.

References Cited in the file of this patent

UNITED STATES PATENTS

| | | |
|---|---|---|
| 1,752,866 | Trombetta | Apr. 1, 1930 |
| 1,881,383 | Wylie | Oct. 4, 1932 |
| 1,944,870 | Apple | Jan. 30, 1934 |
| 2,298,357 | Elvin et al. | Oct. 13, 1942 |
| 2,355,477 | Stahl | Aug. 8, 1944 |
| 2,763,444 | Burlein | Sept. 18, 1956 |
| 3,014,164 | Howenstine | Dec. 19, 1961 |

Disclaimer 3,131,371.—*Byron O. Brekke*, Brooklyn Center, Minn., and *Roy C. Johnston*, Dallas, Tex. WINDING FORM HAVING MEANS FOR PROTECTING ELECTRICAL COIL LEADS. Patent dated Apr. 28, 1964. Disclaimer filed Apr. 21, 1969, by the assignee, *Honeywell Inc.*

Hereby enters this disclaimer to claims 1 through 3 of said patent.

[*Official Gazette September 23, 1969.*]